United States Patent
Kang et al.

(10) Patent No.: US 9,501,239 B2
(45) Date of Patent: Nov. 22, 2016

(54) GROUPING METHOD AND DEVICE FOR ENHANCING REDUNDANCY REMOVING PERFORMANCE FOR STORAGE UNIT

(71) Applicant: Industry-University Cooperation Foundation Hanyang University, Seoul (KR)

(72) Inventors: Soo Yong Kang, Gyeonggi-do (KR); You Jip Won, Gyeonggi-do (KR); Jae Hyuk Cha, Gyeonggi-do (KR); Jong Moo Choi, Gyeonggi-do (KR); Sung Roh Yoon, Seoul (KR); Jong Hwa Kim, Gyeonggi-do (KR); Ik Joon Son, Seoul (KR); Sang Yup Lee, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 247 days.

(21) Appl. No.: 14/366,775

(22) PCT Filed: Dec. 10, 2012

(86) PCT No.: PCT/KR2012/010697
§ 371 (c)(1),
(2) Date: Jun. 19, 2014

(87) PCT Pub. No.: WO2013/100437
PCT Pub. Date: Jul. 4, 2013

(65) Prior Publication Data
US 2014/0337596 A1    Nov. 13, 2014

(30) Foreign Application Priority Data

Dec. 29, 2011  (KR) .................. 10-2011-0145878
Aug. 21, 2012  (KR) .................. 10-2012-0091409

(51) Int. Cl.
*G06F 12/00*    (2006.01)
*G06F 3/06*     (2006.01)
(Continued)

(52) U.S. Cl.
CPC .......... *G06F 3/0641* (2013.01); *G06F 3/0608* (2013.01); *G06F 3/0673* (2013.01); *G06F 11/1453* (2013.01); *G06F 12/0246* (2013.01)

(58) Field of Classification Search
CPC ............ G06F 11/1453; G06F 3/0641; G06F 12/0246
USPC ....................................................... 711/162
See application file for complete search history.

(56) References Cited

U.S. PATENT DOCUMENTS

| 8,135,905 B2 | 3/2012 | Mori |
| 2009/0063883 A1 | 3/2009 | Mori |
| 2010/0185922 A1* | 7/2010 | Haas ................ G06F 17/30286 714/777 |

(Continued)

FOREIGN PATENT DOCUMENTS

| JP | 2009-059096 A | 3/2009 |
| KR | 10-2011-0055263 A | 5/2011 |
| WO | WO 2010/126595 A1 | 11/2010 |

OTHER PUBLICATIONS

Mark Lillibridge et al., "Sparse Indexing: Large Scale, Inline Deduplication Using Sampling and Locality", 7th USENIX Conference on File and Storage Technologies, Feb. 24-29, 2009, pp. 111-123.

(Continued)

*Primary Examiner* — Prasith Thammavong
(74) *Attorney, Agent, or Firm* — Rabin & Berdo, P.C.

(57) ABSTRACT

The present invention relates to a grouping method and device for enhancing redundancy removing performance for a storage unit such as a hard disk, a solid state disk (SSD), etc. The grouping method for enhancing performance of a redundancy removing technology may include: extracting samples from data that is stored in a buffer of a memory and is standing by to be processed; performing remaining calculations on the extracted samples; and grouping samples by connecting them to a bucket corresponding to a resultant value of the remaining calculations.

10 Claims, 5 Drawing Sheets

(51) Int. Cl.
*G06F 11/14* (2006.01)
*G06F 12/02* (2006.01)

(56) References Cited

U.S. PATENT DOCUMENTS

| | | |
|---|---|---|
| 2010/0281207 A1 | 11/2010 | Miller et al. |
| 2011/0231362 A1* | 9/2011 | Attarde ............... G06F 11/3442 707/609 |
| 2012/0150823 A1* | 6/2012 | Tofano .............. G06F 17/30336 707/692 |
| 2012/0150826 A1* | 6/2012 | Vijayan Retnamma ........ G06F 17/30312 707/692 |
| 2012/0233135 A1* | 9/2012 | Tofano .............. G06F 17/30489 707/692 |

OTHER PUBLICATIONS

Fanglu Guo et al., "Building a High-performance Deduplication System", 2011 USENIX Annual Technical Conference, Jun. 15-17, 2011, pp. 271-284.

* cited by examiner

GROUPING METHOD AND DEVICE FOR ENHANCING REDUNDANCY REMOVING PERFORMANCE FOR STORAGE UNIT

TECHNICAL FIELD

The present invention relates to a grouping method and device for enhancing a deduplication performance in a storage device such as a hard disk, a solid state disk (SSD), and the like.

BACKGROUND ART

In deduplication technology, redundancy detection and duplicated data mapping table management may be performed. The redundancy detection may be a method of verifying whether data currently requested to be stored is identical to previously stored data, and performed using a fingerprint method. In particular, a hash value, for example, a secure hash algorithm 1 (SHA-1) or a message-digest algorithm 5 (MD5) of stored data blocks are calculated. A hash value of data block requested to be stored may be calculated and then, compared to the hash value of the stored data blocks. When a redundancy is detected, information indicating that the data requested to be stored is duplicated to the stored data may be recorded on a mapping table, in lieu of actual data.

However, a performance load may occur in a process of calculating the SHA-1 hash value used to detect the duplicated data. An amount of time for calculating the SHA-1 hash value at 4 kilobytes (kB) is described with reference to FIG. 1.

In an example, SHA-1 performance load in a microcontroller may be described with reference to FIG. 1.

Approximately 6212 microseconds (μsec) may be required in a micro-blaze, 5772 μsec may be required in an ARM7, 813 μsec may be required in an ARM9, and 80 μsec may be required in an operation performed by hardware. Many SSDs may operate based on the ARM7 in general. Approximately 1400 μsec may be required based on a writing speed of a multi-level cell (MLC) type flash memory. However, 5772 μsec may be required to calculate the SHA-1 hash value in the ARM7. Thus, when hash values are calculated in response to all requests, use of a solid state disk (SSD) may be inefficient despite an advantage of a speed higher than that of hard disk. Accordingly, there is a desire for a method of extracting an SHA-1 value in response to only a request having a high duplication probability.

DISCLOSURE OF INVENTION

Technical Goals

An aspect of the present invention provides a method of enhancing performance for efficient deduplication in a storage device such as a solid state disk (SSD). Through deduplication, a plurality of requests with respect to identical data may be processed by performing one writing operation, thereby prolonging a life of a flash memory and improving efficiency of a storage space. However, low operation processing performance of a microcontroller, for example, an ARM7 used in the SSD may cause latency in a response time.

Accordingly, the present invention proposes a grouping method and device for adjusting a response time and a duplication probability.

Technical Solutions

According to an aspect of the present invention, there is provided a grouping method of enhancing performance of deduplication technology, the method including extracting a sample from data stored in a memory buffer and in a standby state to be processed, performing a modulo operation on the extracted sample, and grouping the sample by connecting to a bucket corresponding to a result value of the modulo operation.

The extracting may include extracting 20 byte-samples from 1024 items of the data in a standby state to be processed, respectively.

The performing may include performing the modulo operation using "1024" as a divisor on the extracted 20 byte-samples.

The grouping may include grouping samples outputting an identical result value into a single bucket, and providing an identical number of grouped buckets to a number of result values.

A number of the extracted samples may be identical to a number of buckets and a number of empty buckets may increase according to an increase in a number of the grouped samples, the grouping may include removing duplicated data from the extracted samples, the removing may be performed when the number of empty buckets is greater than or equal to a predetermined reference, and the removing may not be performed when the number of empty buckets is less than the predetermined reference.

According to an aspect of the present invention, there is provided a grouping device for enhancing performance of deduplication technology, the device including a sample extractor to extract a sample from data stored in a memory buffer and in a standby state to be processed, an operating unit to perform a modulo operation on the extracted sample, and a grouping unit to group the sample by connecting a bucket corresponding to a result value of the modulo operation.

A number of the samples extracted by the sample extractor may be identical to a number of the buckets and a number of empty buckets may increase according to an increase in the number of the grouped buckets, the grouping unit may include a deduplication unit to remove duplicated data from the extracted samples, duplication may be performed when the number of empty buckets is greater than or equal to a predetermined reference, and the deduplication may not be performed when the number of empty buckets is less than the predetermined reference.

Advantageous Effects

According to an aspect of the present invention, it is possible to solve an issue of an existing technology by using a grouping scheme and sampling a portion of data to be processed. Through this, when a duplication probability is relatively high, deduplication may be performed. In contrast, when the duplication probability is relatively low, the deduplication may not be performed.

According to another aspect of the present invention, it is possible to reduce a number of hash value extraction times by sacrificing a duplication probability causing a reduced amount of performance load occurring when a SHA-1 hash value is extracted based on an existing deduplication technology, thereby improving performance.

BEST MODE FOR CARRYING OUT THE INVENTION

Hereinafter, a grouping method and apparatus for enhancing deduplication performance in a storage device will be described in more detail with reference to the accompanying drawings.

The present invention proposes a performance improving scheme for efficient deduplication in a storage device such as a solid state disk (SSD). Through the deduplication, a plurality of storing requests with respect to identical data may be processed by performing one writing operation, thereby improving a life of a flash memory and efficiency of a storage space. However, low operation processing performance of a microcontroller, for example, an ARM7 used in the SSD may cause latency in a response time. Accordingly, the present invention employs a grouping method and device for adjusting a response time and a duplication probability.

Figure 1:
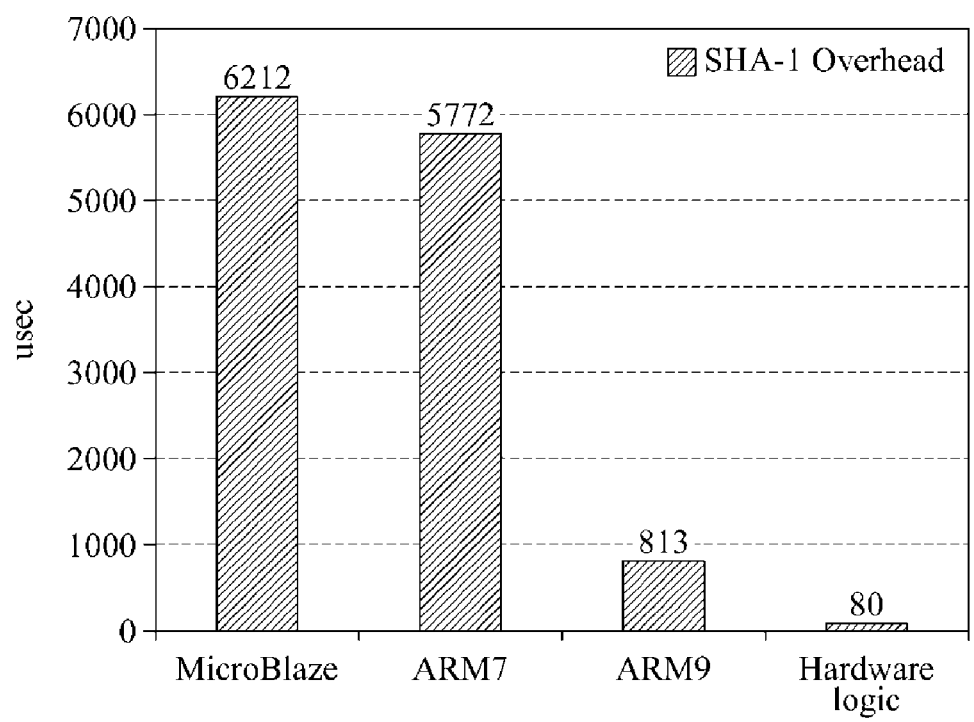
FIG. 1 is a graph illustrating performance load occurring when a secure hash algorithm 1 (SHA-1) hash value is to be obtained in a microcontroller.
Figure 2:
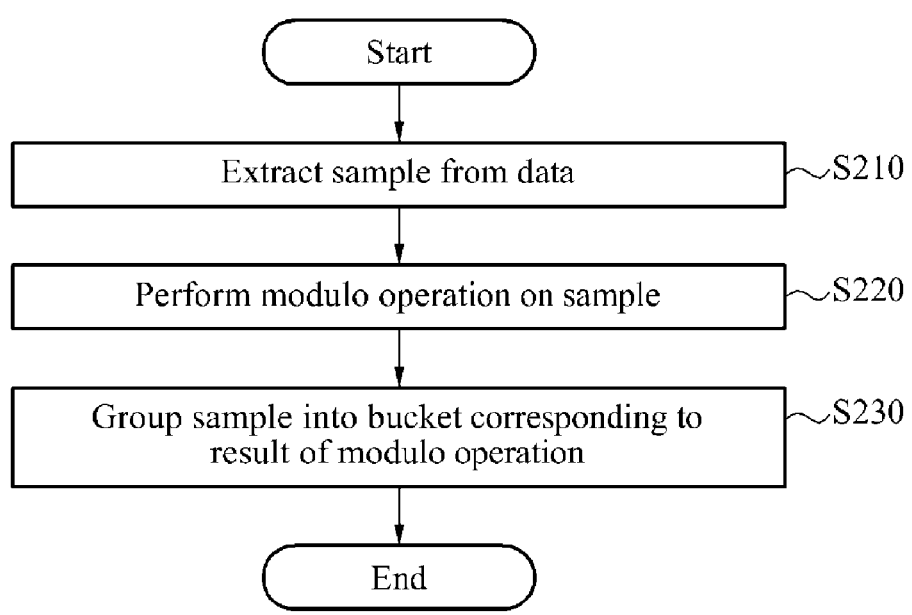
FIG. 2 is a flowchart illustrating a grouping method of enhancing deduplication performance according to an embodiment of the present invention.

FIG. 2 is a flowchart illustrating a grouping method of enhancing deduplication performance according to an embodiment of the present invention.

An SSD may store data input through a serial advanced technology attachment (SATA) interface in a buffer of a memory. The SSD may process each new request received in the buffer, at a time and eliminate a request on which a processing is completed, from the buffer. In operation S210, before the processing of the request received in the buffer, a sample may be extracted from data in a standby state.

When the sample is extracted from the data, 20 bytes-samples may be extracted from approximately 1024 items of the data. For increased efficiency of the invention, a quantity of data from which samples are extracted may be assumed to be "1024".

In operation S220, a modulo operation may be performed on the extracted sample for grouping of samples. The modulo operation may be performed to obtain a remainder, for example, a remainder left after subtracting one number from another. As an example, samples may be extracted from 1024 data, and the modulo operation may be performed based on "1024". A result value of the modulo operation may correspond to a value between "0" and "1023".

In operation S230, based on a result of the modulo operation, samples having an identical result value may be grouped by connecting the samples to a corresponding bucket. In this example, the samples having an identical result value may be grouped into an identical bucket, and other samples may be grouped into corresponding groups. In an embodiment, a number of samples, for example, a quantity of data from which the samples are extracted may be identical to a number of buckets for grouping. For example, since the number of samples is "1024", the number of buckets may be "1024".

When the grouping is performed based on the result value of the modulo operation, a number of empty buckets may increase according to an increase in a number of samples grouped into an identical bucket. An identical result value of the modulo operation may indicate a high probability of data duplication. Thus, the increase in the number of empty buckets may indicate the high probability of data duplication. Conversely, a decrease in the number of empty buckets may indicate a low probability of data duplication.

In the present invention, to overcome an issue arising from an existing technology, a grouping scheme may be applied to sample a portion of data to be processed such that to deduplication may be performed when a duplication probability is relatively high while the deduplication may not performed when the duplication probability is relatively low. In the present invention, data included in a buffer of a memory in which requests to be processed are present may be analyzed such that the duplication is performed when a duplication probability is relatively high.

In an embodiment, the grouping method may include an operation of deduplicating duplicated data. The deduplicating may be performed when a duplication probability of an extracted sample is relatively high, and not be performed when the duplication probability is relatively low.

Since the duplication probability may be indicated based on the number of empty buckets after the grouping is performed in operation S230, the number of empty buckets may be used as a reference of deduplication. When the number of empty buckets is greater than or equal to a predetermined reference, the duplication probability may be verified to be high and thus, the deduplicating may be performed. Conversely, when the number of empty buckets is less than the predetermined reference, the duplication probability may be verified to be low and thus, the deduplicating may not be performed. In an embodiment, when the reference of deduplication is set to be 50%, the duplication probability may be reduced to be 20%, and performance load in the deduplicating may be reduced by 80%.

Figure 3:
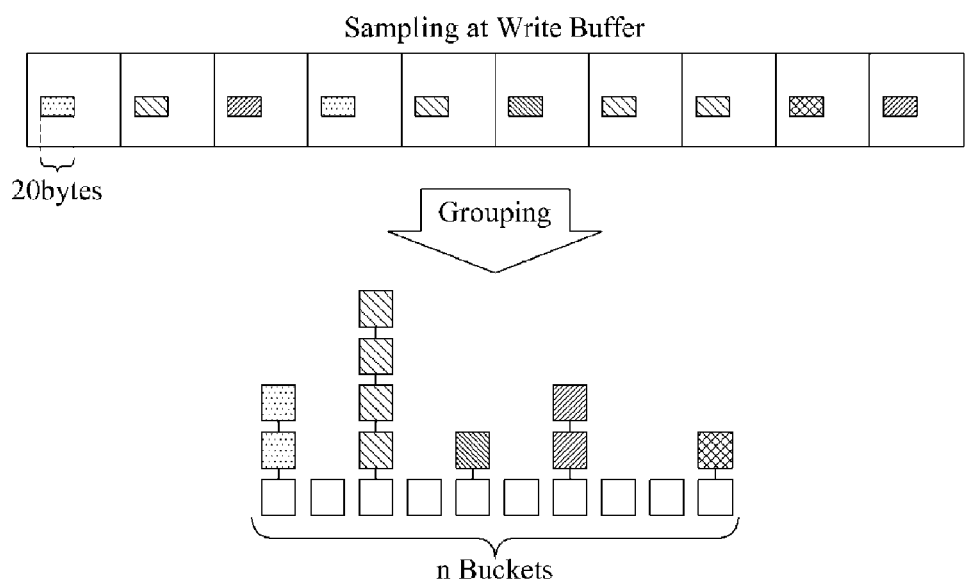
FIG. 3 is a diagram illustrating an example of implementing a grouping method according to an embodiment of the present invention.
Figure 4:
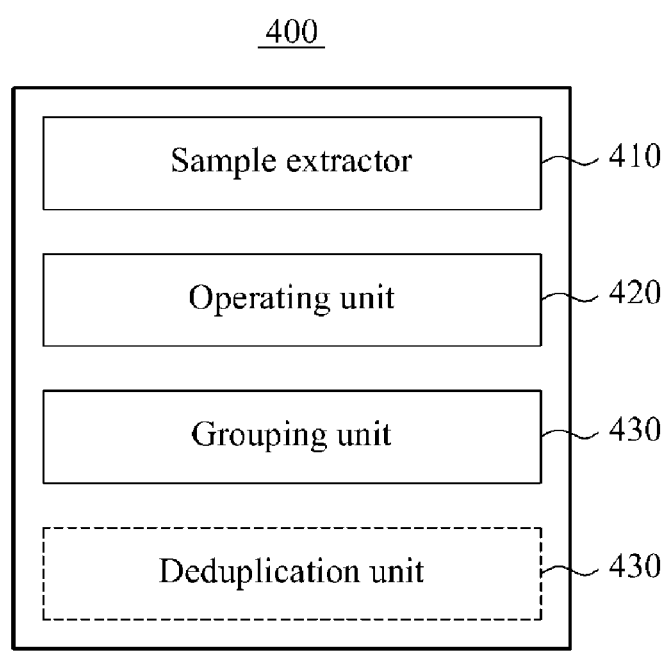
FIG. 4 is a block diagram illustrating a configuration of a grouping device for enhancing deduplication performance according to an embodiment of the present invention.

FIG. 3 is a diagram illustrating an example of implementing a grouping method according to an embodiment of the present invention. As described above, when data included in a buffer is sampled to be grouped, a quantity of data may be identical to a number of buckets.

An SSD may store data input through an SATA interface in a buffer of a memory. The SSD may process each new request received in the buffer, at a time and remove a request on which a processing is completed, from the buffer. In this instance, an operation of deduplicating including generating a fingerprint, detecting redundancy, and mapping duplicated data may be performed on data being processed. As an example, the generating having a largest amount of performance load may require 5770 microseconds (μsec) for a process of secure hash algorithm 1 (SHA-1) hash extraction in an ARM7 generally used in the SSD. Thus, by performing the deduplicating only when a duplication probability is high, an unnecessary process of the SHA-1 hash extraction may be removed and thus, an amount of performance load may be efficiently reduced.

According to an embodiment of the present invention, a storage device may include a grouping device 400 for enhancing deduplication technology. The grouping device 400 may include a sample extractor 410, an operating unit 420, and a grouping unit 430. Hereinafter, the grouping device 400 may be a device for implementing the grouping method of FIG. 2. Each element configuring the grouping device 400 may be combined, or one of the elements may be omitted.

An SSD may store data input through an SATA interface in a buffer of a memory. The SSD may process each new request received in the buffer, at a time and remove a request on which a processing is completed, from the buffer. In this instance, the sample extractor 410 may extract a sample from data input to the SSD, stored in the buffer of the memory, and in a standby state to be processed.

In an embodiment, the sample extractor 410 may extract approximately 20 bytes-samples from approximately 1024 data. For increased efficiency of the invention, a quantity of data may be assumed to be "1024".

The grouping device 400 may include the operating unit 420 to perform a modulo operation to detect a duplication probability for grouping the extracted samples. Since the samples are extracted from the approximately 1024 data, an operator, for example, a divisor of the modulo operation may be "1024". In this example, the grouping may be performed based on samples having an identical result value.

The grouping unit 430 may group samples having an identical result value obtained by the operating unit 420 and connect to a corresponding bucket. Other samples may be grouped into corresponding buckets, respectively. In an embodiment, a number of samples, for example, a quantity of data from which a sample extracted may be identical to a number of buckets. For example, since the number of samples is "1024", the number of buckets may be "1024".

When the grouping is performed based on the result value of the modulo operation, a number of empty buckets may increase according to an increase in a number of samples grouped into an identical bucket. An identical result value of the modulo operation may indicate a high probability of data duplication. Thus, the increase in the number of empty buckets may indicate the high probability of data duplication. Conversely, a decrease in the number of empty buckets may indicate a low probability of data duplication.

In the present invention, to overcome an issue arising from an existing technology, sampling may be performed on a portion of data to be processed such that deduplication may be performed when a duplication probability is relatively high while the deduplication may not performed when the duplication probability is relatively low. In the present invention, data included in a buffer of a memory in which requests to be processed are present may be to be analyzed such that the duplication is performed using a deduplication unit 440 when a duplication probability is relatively high.

The deduplication unit 440 may perform the deduplication when the duplication probability of the extracted sample is relatively high, and may not perform the deduplication when the duplication probability is relatively low. As described above, a reference of the deduplication is related to the duplication probability. Since the duplication probability may be indicated based on the number of empty buckets after the grouping is performed, the number of empty buckets may be used to be the reference of the deduplication. For example, when the number of empty buckets is greater than or equal to a predetermined reference, the duplication probability may be verified to be high and thus, the deduplicating may be performed. Conversely, when the number of empty buckets is less than the predetermined reference, the duplication probability may be verified to be low and thus, the deduplicating may not be performed.

Figure 5:
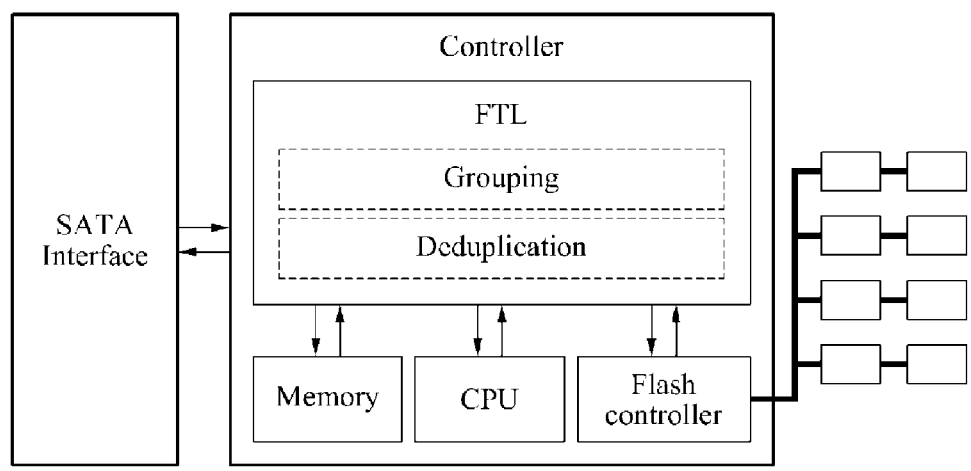
FIG. 5 is a block diagram illustrating a configuration of a solid state disk (SSD) to which the present disclosure is applied according to an embodiment of the present invention.

Referring to FIG. 5, the present invention may be implemented in a controller included in the SSD. As described above, data input and data output may be performed through an SATA interface, and the controller included in the SSD may include a central processing unit (CPU), a memory, and a flash controller.

In an embodiment, a device for performing the grouping method and a device for performing the deduplicating may be separately provided, and a flash translation layer (FTL) and deduplication technology may be applied thereto. In an embodiment, the grouping method may be performed prior to the deduplication technology. When grouping is performed on data included in a buffer of a memory, whether the deduplication technology is implemented may be determined based on a duplication probability.

As described above, a method of enhancing performance for efficient deduplication in an SSD corresponding to a storage device may be proposed. Through the deduplication, a plurality of storing requests with respect to identical data may be processed by performing one writing operation, thereby improving a life of a flash memory and efficiency of a storage space.

The functions in the above-described exemplary embodiments, that is, the grouping method of efficiently deduplicating in a storage device may be recorded in non-transitory computer-readable media including program instructions to implement the various functions by a computer. The media may also include, alone or in combination with the program instructions, data files, data structures, and the like. The program instructions recorded on the media may be those specially designed and constructed, or they may be of the kind well-known and available to those having skill in the computer software arts.

Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described exemplary embodiments may be implemented as hardware devices, and may be configured to act as one or more software modules in order to perform the functions of the above-described embodiments, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A grouping method of enhancing performance of deduplication technology, the method comprising:
   extracting a sample from data stored in a memory buffer and in a standby state to be processed;
   performing a modulo operation on the extracted sample;
   grouping the sample by connecting to one of a plurality of buckets corresponding to a result value of the modulo operation; and
   removing duplicated data from the extracted sample,
   wherein the removing is performed based on a number of empty buckets of the plurality of buckets.

2. The method of claim 1, wherein the extracting comprises extracting 20 byte-samples from 1024 items of the data in a standby state to be processed, respectively.

3. The method of claim 2, wherein the performing comprises performing the modulo operation using "1024" as a divisor on the extracted 20 byte-samples.

4. The method of claim 1, wherein the grouping comprises grouping samples outputting an identical result value into a single bucket, and providing an identical number of grouped buckets to a number of result values.

5. The method of claim 1, wherein a number of the extracted samples is identical to a number of buckets, and a number of empty buckets increases according to an increase in a number of the grouped samples, wherein the grouping comprises removing duplicated data from the extracted samples, wherein the removing is performed when the number of empty buckets is greater than or equal to a predetermined reference, and wherein the removing is not performed when the number of empty buckets is less than the predetermined reference.

6. A grouping device for enhancing performance of deduplication technology, the device comprising:

a sample extractor configured to extract a sample from data stored in a memory buffer and in a standby state to be processed;

an operating unit configured to perform a modulo operation on the extracted sample;

a grouping unit configured to group the sample by connecting a bucket corresponding to a result value of the modulo operation; and a deduplication unit configured to remove duplicated data from the extracted samples, wherein the deduplication unit is performed based on the number of empty buckets of the plurality of buckets.

7. The device of claim 6, wherein the sample extractor extracts 20 byte-samples from 1024 items of the data in a standby state to be processed, respectively.

8. The device of claim 7, wherein the operating unit performs the modulo operation using "1024" as a divisor on the extracted 20 byte-samples.

9. The device of claim 6, wherein the grouping unit groups samples outputting an identical result value into a single bucket, and provides an identical number of the grouped buckets to a number of result values.

10. The device of claim 6, wherein a number of the samples extracted by the sample extractor is identical to a number of the buckets, and a number of empty buckets increases according to an increase in the number of the grouped buckets, wherein the grouping unit comprises a deduplication unit to remove duplicated data from the extracted samples, wherein duplication is performed when the number of empty buckets is greater than or equal to a predetermined reference, and wherein the deduplication is not performed when the number of empty buckets is less than the predetermined reference.

\* \* \* \* \*